US005961758A

United States Patent [19]

Honegger

[11] Patent Number: 5,961,758

[45] Date of Patent: Oct. 5, 1999

[54] PROCESS FOR MANUFACTURING BOOKLETS

[75] Inventor: Werner Honegger, Tann-Rüti, Switzerland

[73] Assignee: Ferag AG, Hinwil, Switzerland

[21] Appl. No.: 08/054,793

[22] Filed: Apr. 28, 1993

Related U.S. Application Data

[63] Continuation-in-part of application No. 07/990,946, Dec. 14, 1992, abandoned, which is a continuation of application No. 07/492,532, Mar. 7, 1990, abandoned.

[30] Foreign Application Priority Data

Mar. 30, 1989 [CH] Switzerland ............................ 1155/89

[51] Int. Cl.[6] ...................................................... B32B 31/16

[52] U.S. Cl. .......................... 156/73.1; 156/226; 156/253

[58] Field of Search ................................. 156/73.1, 73.3, 156/253, 221, 222, 226; 412/2, 8, 19, 37; 270/52.5, 53

[56] References Cited

U.S. PATENT DOCUMENTS

| | | | |
|---|---|---|---|
| 3,025,082 | 3/1962 | Toulmin et al. | 281/21 |
| 3,031,349 | 4/1962 | Dritz | 156/513 |
| 3,122,465 | 2/1964 | Keller et al. | 156/93 |
| 3,616,034 | 10/1971 | Obergfell | 156/295 |
| 3,814,654 | 6/1974 | Kugel | 156/290 |
| 3,966,185 | 6/1976 | McCain et al. | 270/53 X |
| 4,032,131 | 6/1977 | Davis | 270/53 |
| 4,149,288 | 4/1979 | Sendor et al. | 11/1 AD |
| 4,512,945 | 4/1985 | Vigano | 264/263 |
| 4,601,462 | 7/1986 | Bowman | 270/53 X |
| 4,715,758 | 12/1987 | Stobb | 412/8 |
| 4,939,888 | 7/1990 | Katz et al. | 270/52.5 X |

FOREIGN PATENT DOCUMENTS

| | | |
|---|---|---|
| 2 338 806 | 8/1977 | France . |
| 2 491 392 | 4/1982 | France . |
| 2 126 495 | 12/1971 | Germany . |
| WO79/00839 | 10/1979 | WIPO . |

*Primary Examiner*—James Sells
*Attorney, Agent, or Firm*—Walter C. Farley

[57] ABSTRACT

For manufacturing printed products such as books or booklets consisting of a stack of paper sheets adhesively joined together and folded along a middle line, a plurality of paper webs are brought together to form a stack of paper layers moving continuously. Into the continuously moving stack a liquid binder is injected along equidistant lines perpendicular to the moving direction of the stack. After binder injection, two,additional webs are brought together with the stack to cover the stack on both sides. Then the stack is cut midway between each pair of junction lines to form individual stacks and the individual stacks are folded along the junction line.

10 Claims, 4 Drawing Sheets

PROCESS FOR MANUFACTURING BOOKLETS

CROSS-REFERENCE TO RELATED APPLICATION

This is a continuation-in-part of application Ser. No. 07/990,946 filed Dec. 14, 1992, now abandoned, which is a continuation of Ser. No. 07/492,532 filed Mar. 7, 1990, now abandoned.

FIELD OF THE INVENTION

The invention is in the field of processing printed paper into printed products such as books, booklets, brochures and so on. More particularly, it relates to a process for manufacturing from a plurality of fast moving paper webs, such as are continuously output by a rotary printing press or unwound from rolls, products such as booklets, brochures or the like in the form of a stack of paper sheets joined and folded along a middle line.

BACKGROUND OF THE INVENTION

Booklets or brochures in the form of a stack of paper sheets joined together and folded along a middle line are usually manufactured by collecting the sheets and stitching them together, using, e.g. wire stitching. Either the sheets are folded separately before collecting or the stack is folded after stitching. There are also apparatus in use for stitching continuously moving paper stacks. The disadvantage of stitched booklets is the fact that their fold region has an increased thickness. This is not so much the case for booklets from paper sheets which are adhesively joined together. Furthermore, wire stitched booklets contain foreign material which is unwanted for recycling. This also is not the case for booklets with adhesively joined pages.

There are known processes for adhesively joining paper layers but either they cannot be adapted for production speeds such as are necessary for continuously processing the output of a modern rotary printing press or else they require very complicated apparatus.

SUMMARY OF THE INVENTION

It is therefore an object of the invention to provide a method for producing booklets, brochures and so on consisting of a stack of paper sheets adhesively joined and folded along a middle line from a plurality of paper webs, in particular from a plurality of paper webs forming a continuous, fast moving stack (such as the lengthwise folded and/or lengthwise cut output of a rotary press). The method must be adaptable to the high production speed of modern rotary printing presses and must be realizable with a minimum of equipment regardless of the number of paper layers to be joined.

According to the inventive process, continuously moving paper webs are led together to form a continuously moving paper stack. Into this stack a liquid binder is injected along equally spaced lines perpendicular to the moving direction of the stack. The injection process is controlled so that the binder penetrates all the layers of the stack. The stack is then covered on both sides with an additional web and pressed at least in the vicinity of the injection line and/or treated otherwise in order to achieve an adhesive junction of the paper layers along the injection line. Then the continuous stack is cut into individual stacks between each two injection lines and folded immediately afterwards along the injection line.

Booklets or brochures produced according to the inventive method may be finished products or can be further processed such as by joining and binding several of them to form a book.

Besides the process speed which can be achieved with the inventive process, it is advantageous because the liquid binder wets the paper layers in the region of the injection and, as most of the binder is deposited in the inside of the stack, it does not dry before folding. As is known, moist paper can be folded more easily than dry paper so that with the inventive process a cleaner, thinner fold can be achieved.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this disclosure, and wherein.

FIGS. *6a* and *6b* are transverse sectional views, taken perpendicular to the moving direction of the stack, a further embodiment of apparatus for joining the webs.

DESCRIPTION OF THE PREFERRED EMBODIMENT

Figure 2:
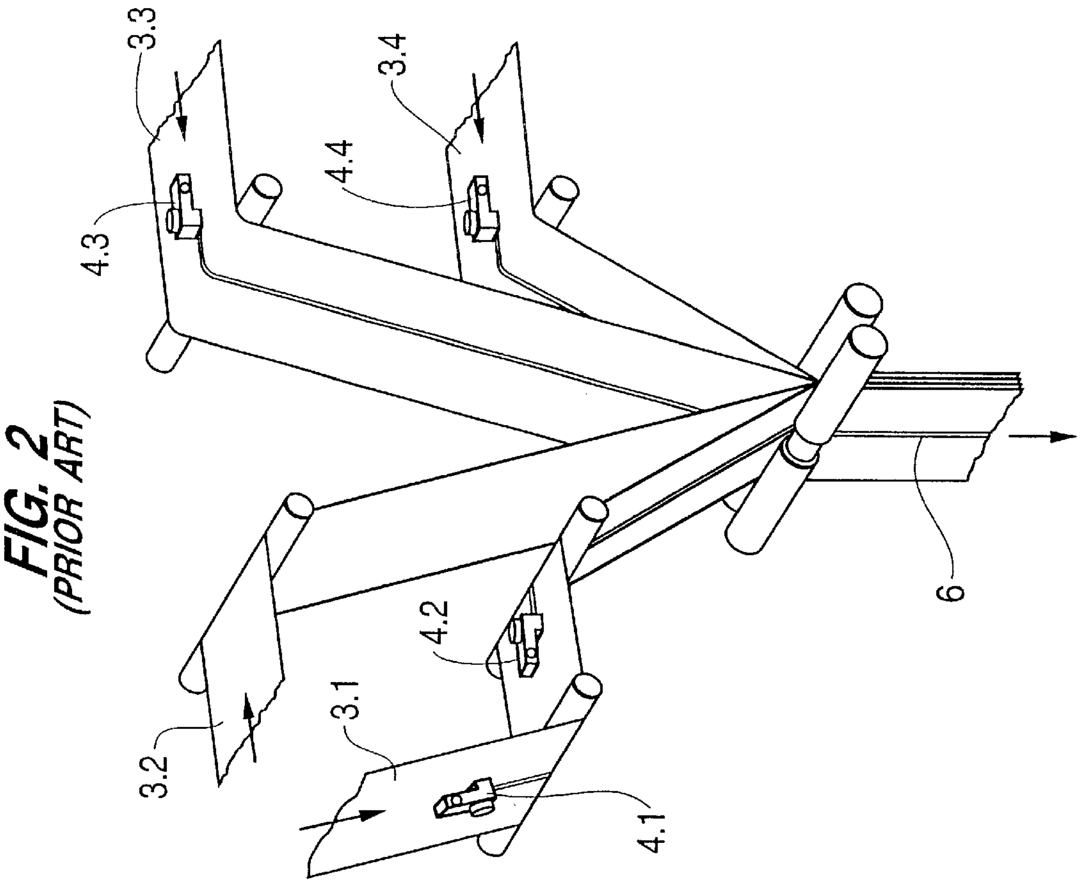
FIG. 2 (PRIOR ART)
FIGS. 1 and 2 are perspective views of apparatus for performing two methods according to the state of the art for adhesively joining a plurality of continuous paper webs along lines perpendicular to the moving direction (FIG. 1) or along a line parallel to the moving direction (FIG. 2)
Figure 1:
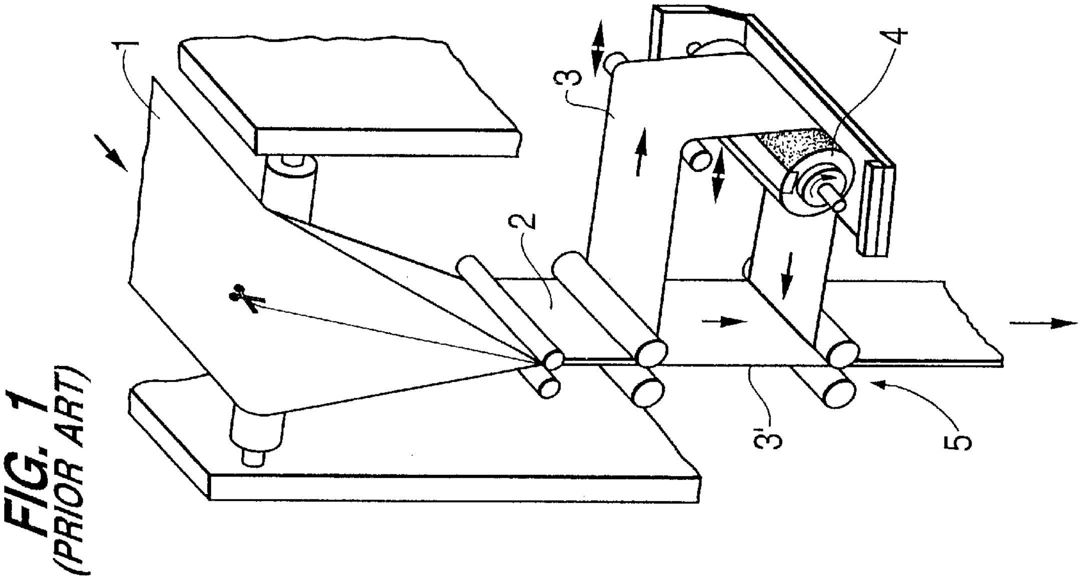
FIG. 1 (PRIOR ART)

FIGS. 1 and 2 are schematic illustrations of two processes according to the state of the art for adhesively joining continuous paper webs. In one known process, the continuous webs are separated to run through separate apparatus for glue application and are then joined to form a stack after application. This is particularly disadvantageous for webs which are output from a rotary press and are already in the form of a stack. Additional disadvantages are the necessity for many kinds of application apparatus, the space needed for that apparatus, the complicated process for starting production, the difficulty of coordinating the application apparatus such that all the glue applications are exactly on the same line in the stack, the restriction imposed on the glue as it must keep its gluing character up to the moment of the joining of the layers into the stack, the care that has to be taken that the layers with the applied glue do not come into contact with each other except in the exact position of the stack, and so on.

FIG. 1 shows an apparatus according to the state of the art for joining two continuous paper webs along equally spaced lines perpendicular to the moving direction of the webs. A paper web 1, such as the output from a rotary press, is folded and cut in half along a longitudinal line to form a stack 2 of two partial webs 3 and 3'. For binder application along equally spaced lines perpendicular to the moving direction of the stack, the two partial webs 3 and 3' are separated and one of them 3 is run around a binder application roll 4. This roll 4 has at least one line of perforations through which binder is applied to the part web 3. Then the part webs 3 and 3' are led together to form again a stack and are pressed together by a pair of pressing rolls (5).

It is obvious, that in the same way more than two webs or partial webs can be joined, but that for each additional web an additional binder application roll must be installed.

FIG. 2 shows the joining of paper webs 3.1 to 3.4 along a line 6 running lengthwise along the webs. For this process, in the same way as for the process illustrated by FIG. 1, for each web there must be a binder application installation 4.1 to 4.4, which makes it necessary to run the webs quite separately.

Figure 3:
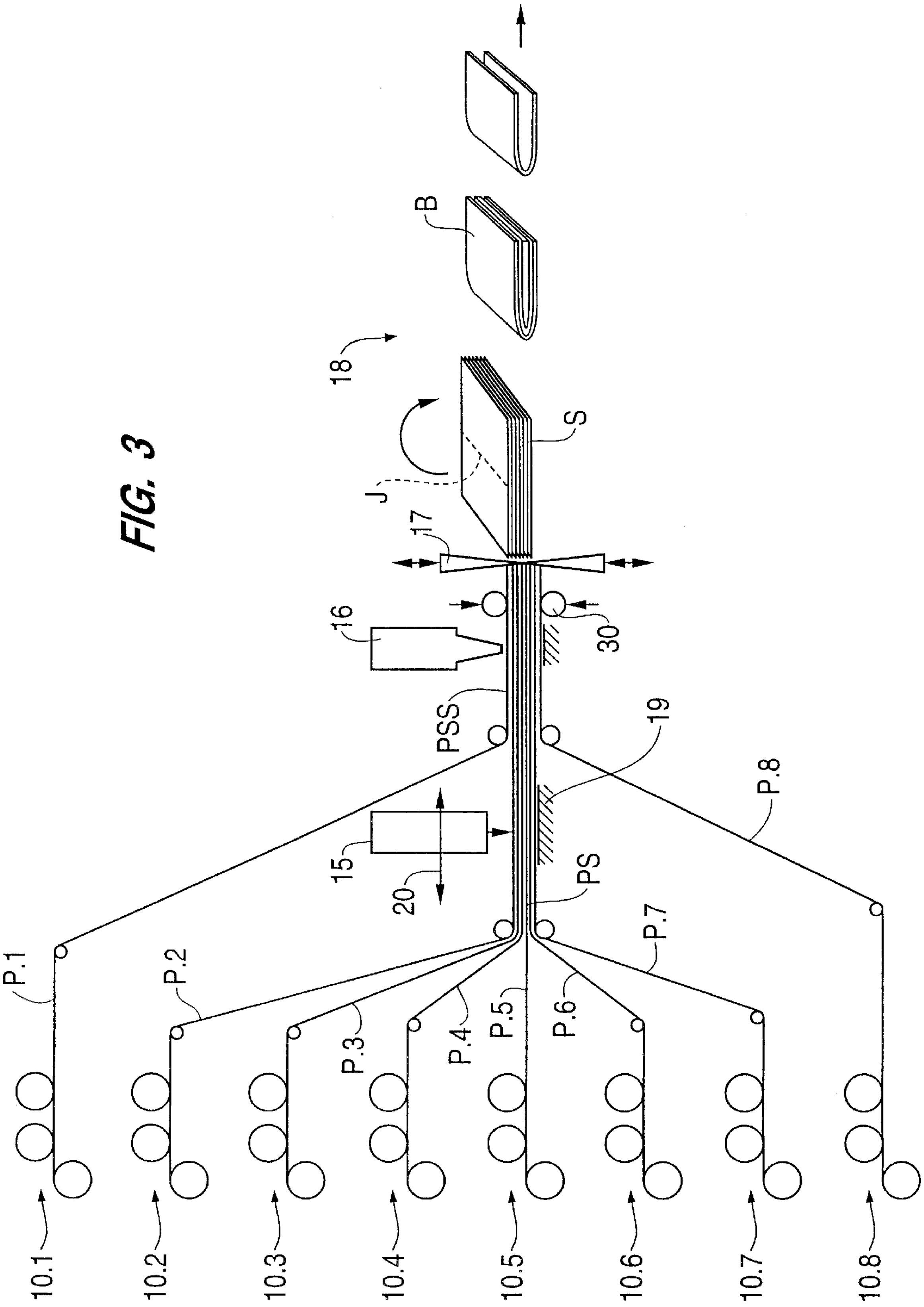
FIG. 3 is a side elevation of apparatus for performing the method according to the invention.

FIG. 3 schematically shows an installation for one example of an embodiment of the method according to the invention. Continuously moving paper webs P.2 to P.7 are led together to form a continuously moving paper stack PS. The webs can be produced by separate printing apparatus 10.2 to 10.7. They can of course as well be the lengthwise folded and cut continuous product of only one rotary printing press or the combined product of several rotary presses. Furthermore, some or all of the webs can be unrolled from storage rolls. Into the webs running in the stack a liquid binder is injected by an injection apparatus 15 which is designed, installed and controlled such that the binder is injected along equally spaced lines perpendicular to the moving direction, the injection being such that all the webs are moistened by the binder, i.e. the top and bottom web also. To counteract the impact force of the injection, the stack must be supported on the opposite side by a supporting means 19 which is preferably designed so that its supporting surface moves with the stack. To achieve a virtually invisible joint, after injection the stack can be covered as illustrated by top and bottom cover webs P.1 and P.8, to form a stack PSS with covered injection lines. The stack can then be after-treated by after-treatment apparatus 16, if necessary, by ultrasonic energy and/or pressing between a pair of pressing rolls 30 and is then cut by a cutting apparatus 17 into individual stacks 5 which are then folded along the injection line J to form booklets or brochures B. The fold of the booklet can be further treated by pressing and drying or the like and the booklet itself can be finished by pressing, trimming and so on, which is not shown in the Figure.

As is easily seen in FIG. 3, none of the disadvantages mentioned in connection with the state of the art apply to this process. If the paper webs are output as a continuous stack, the layers do not have to be separated for binder application. As the binder is applied to the layers forming a stack already, the layers are not moved separately between binder application and joining of the layers, so that the lines on which the binder is positioned in each layer keep their relative positions which leads to a very accurate and narrow junction line.

The process according to the invention differs also from known methods for manufacturing booklets from separate sheets collected into stacks in that the webs are cut into separate sheets only when these are already joined so that they cannot move relative to each other and they do not need any repositioning.

A further advantage of the method according to the invention over the methods according to the state of the art as illustrated in FIGS. 1 and 2 is that the required apparatus is much simpler and that it remains similarly simple whether the stack contains few or many webs. For really very many webs, it might become necessary to inject the binder from both sides of the stack.

The liquid binder used for the process according to the invention must be adapted to the paper quality. It can be injected hot or cold. Advantageously, it contains water which moistens the vicinity of the injection line and keeps it wet up to the folding operation. As is known, moistened paper can be folded more easily than dry paper and a cleaner, thinner fold can be achieved such that the folded product can be stacked without problems.

Figure 4:
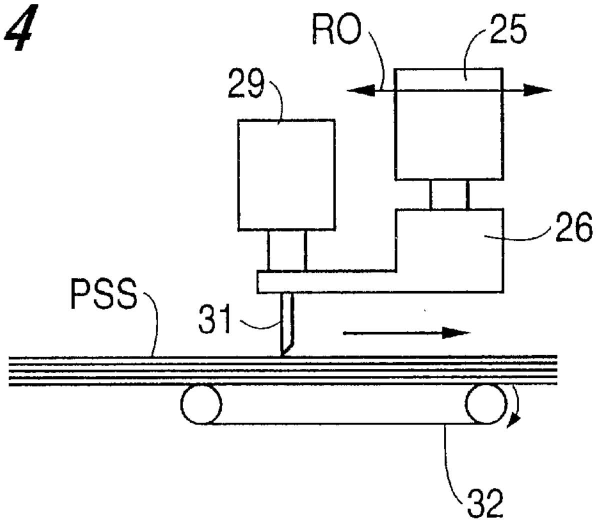
FIG. 4 is a side elevation, perpendicular to the moving direction of the stack, of one of a row of injection needles.
Figure 5:
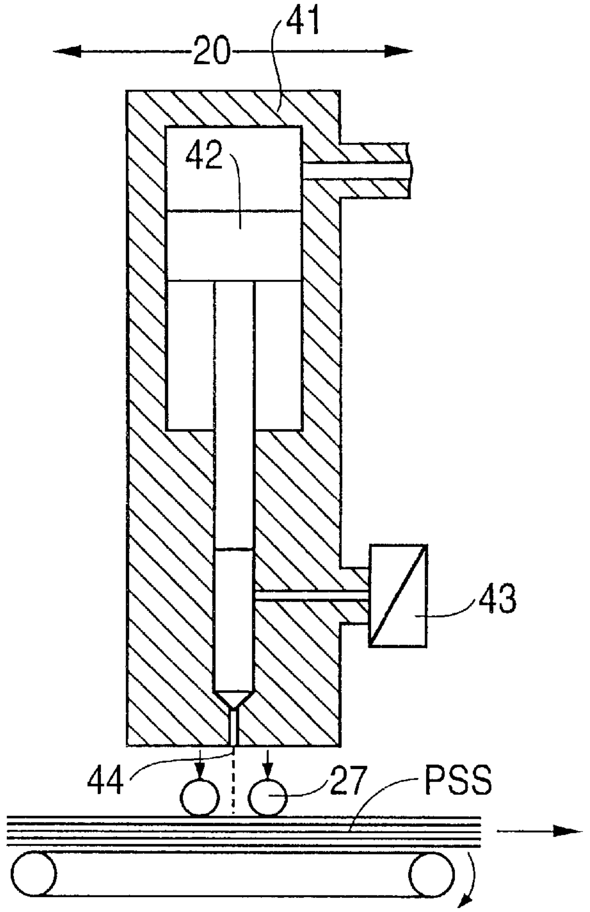
FIG. 5 is a side elevation, in section parallel to the moving direction of the stack, an apparatus for binder shooting showing one of a row of nozzles.

As will be shown in connection with FIGS. 4, 5 and 6, the injection of the binder is either done through one or a plurality of hollow (tubular) injection needles which are pressed into the paper stack or by shooting the binder through a nozzle into the stack with enough energy to penetrate the whole stack. A further injection method consists of pre-perforating the paper with one or a plurality of needles and immediately thereafter pressing binder into the perforation. In all cases, the paper webs are perforated in such a fine way that this perforation is hardly visible on the finished product. The joining line so achieved is very narrow such that the finished product can be opened between all the pages with no problem. Furthermore, the fine perforation facilitates the folding operation.

If a needle or a row of hollow needles is employed for the injection, these are pressed through the stack and then retrieved while binder is pressed into the needles. The movement of the needles and the binder flow through the needle can be controlled so that in the area of the top surface of the stack there is more binder, wetting a wider area of the stack than on the bottom of the stack. In that case it is advantageous to fold the stack such that the top cover sheet becomes the middle sheet of the booklet as shown in FIG. 3. In the same way, when shooting the binder into the stack such as from the top, there will be more binder in the area of the top of the stack than in the bottom. In this case also the stack is advantageously folded toward the top.

Obviously there is no necessity to run the stack in a horizontal direction as shown in FIG. 3. Without any disadvantage the stack can be run downward, upward or in any direction.

The joint of a booklet produced by the inventive method differs from booklets joined by stitching because the joint of the unstitched booklet is hardly visible and, if the stack is covered on both sides with covering webs, the joint is even invisible. A further difference is that a booklet made in accordance with the invention has, by comparison, a very clean fold.

At the speeds necessary for continuously processing the stack of webs output by a rotary printing press, for achieving the necessary narrow line of binder injection it is imperative that the injection needles or the shooting nozzles are moved with the webs during the injection, which is indicated in FIG. 3 by the arrow 20.

As mentioned above, the injection can be accomplished either by using hollow needles with which the paper layers are perforated and through which the binder is injected; by shooting the binder into the paper layers with sufficient force to penetrate all the layers; or by pre-perforating the paper layers with needles and then pressing binder into the perforation. FIGS. 4, 5 and 6 show means for carrying out the injection step.

FIG. 4 schematically shows means for binder injection employing hollow needles. This can be a row of hollow needles 31 aligned perpendicular to the moving direction of the continuous stack PSS and a binder supply system 25, 26 wherein at least the needles are arranged flying, i.e., moving with the stack, as shown by arrow 20, over the continuously moving paper layers PSS. FIG. 4 shows one such needle 31 as viewed perpendicular to the moving direction of the stack, a needle pressing device 29 for pressing the needles into the stack, a binder reservoir 25 and a binder pressing device 26 for pressing the binder into the needles. The flying movement of the needles or the whole injection apparatus is coordinated with the speed of the stack and with the injecting movement of the needles such that the needles move with the stack at least as long as they are lowered into the stack and that they are returned to their starting position when the stack has moved the predetermined distance between two injection lines.

On the opposite side of the stack there is an injection support in the form of an endless conveyor belt 32 for counteracting the impact force of the injection.

Instead of a coordinated row of needles of which each needle only moves forwards and backwards parallel to the moving direction of the stack, only one or a much smaller number of needles can be employed, the needle or needles then additionally being moved perpendicular to the moving direction of the stack.

FIG. 5 shows in section parallel to the moving direction of the continuously moving stack PSS an apparatus for binder shooting with a row of nozzles. In the figure one such nozzle 44 is visible.

The principle of shooting binder droplets into paper layers is based on the high-pressure, water-jet cutting method which is used for cutting materials such as plastic materials in the form of stacked sheets. For cutting, the water is initially brought up to a pressure of several kbar and ejected through a cutting nozzle with an initial velocity of about 600 to 1000 m/sec.

For paper, as for other fibrous materials, water-jet cutting has not been successful because of an unsatisfactory cut quality and the fact that the cutting water penetrated into the material, wetting it in the vicinity of the cutting line. The causes for the lack of success of the water jet cutting of paper are the causes of the success of the injection of binder by shooting. What is wanted and is achieved is a fine perforation of the paper (not a clean cut) accompanied by wetting of the paper in the vicinity of the perforation (not a dry product). It is obvious that the process parameters such as the pressure of the binder and the form of the nozzle have to be adapted carefully by corresponding experiments to the injection process and to the quality of the binder and of the paper to be joined by the process.

The apparatus for injection by shooting has a cylindrical pressure vessel 41 containing a booster plunger 42, a recharging valve 43 and an injection nozzle 44 at an end of vessel 41. The liquid binder medium is kept under pressure in the pressure vessel and is supplied into the nozzle and injected into the paper intermittently by the movement of the recharging valve 43.

For the injection, the stack of paper layers can be pressed together with the aid of a pressing device 27 in the form of corresponding pressing rolls so that the kinetic energy of the binder is not used up in the mechanical displacement of the paper layers.

In the same way as discussed in connection with the injection process employing hollow needles, for the process with injection by shooting at least the injection nozzles must be arranged flying over the moving paper stack so that there is no relative movement between stack and nozzle during injection. Also, analogous to the process with needles, one, a small number or a whole row of injection nozzles can be employed.

Figure 6B:
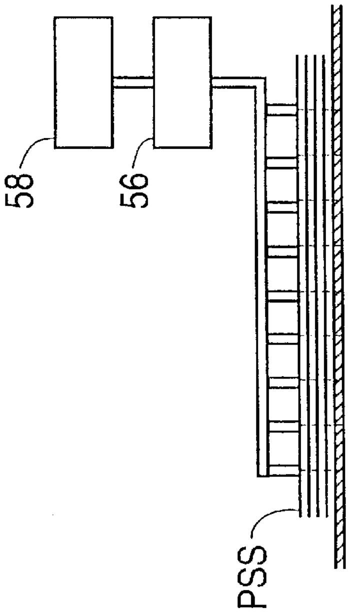
Figure 6A:
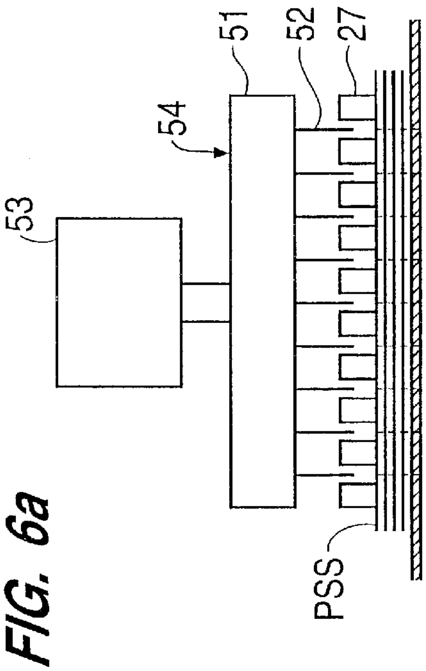

FIG. 6*a* and 6*b* show in views parallel to the moving direction of the stack a further applicable apparatus for the joining of the webs. This includes a row of needles (FIG. 6*a*) for pre-perforating which is immediately followed downstream by an apparatus (FIG. 6*b*) for pressing binder into the perforations.

The pre-perforating apparatus indicated generally at 54 includes a strip or support bar 51 which supports a plurality of comb tooth-like pre-perforating needles 52 connected to a needle pressing device 53. Following perforation, binder is pressed into the perforations by a binder pressing device 56 supplied from a binder reservoir 58. The paper layers can be pressed together during pre-perforation and/or binder injection by a pressing device 57 having pressing rolls.

Figure 7:
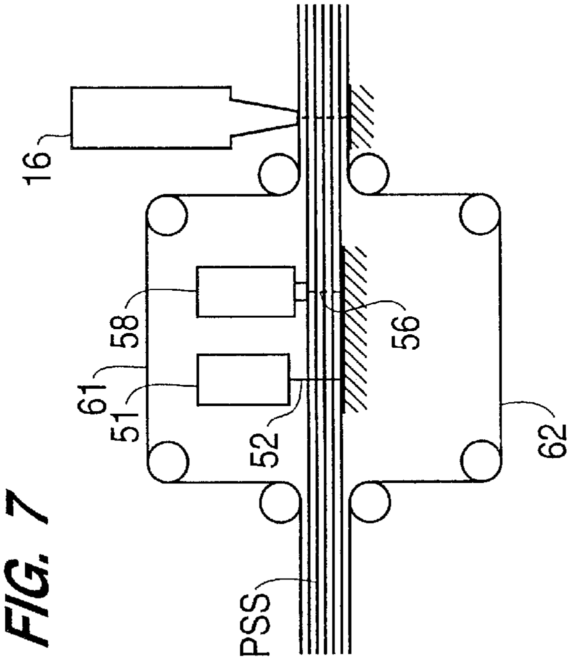
FIG. 7 shows a further example of an embodiment of the method according to the invention.

FIG. 7 shows a further embodiment according to the invention wherein a continuous stack PSS, which can be the lengthwise folded and lengthwise cut output of a rotary printing press, is conveyed into the processing area. Top and bottom webs 61 and 62 are guided away from the stack. Then the remaining layers of the stack are perforated by a perforation apparatus 51–54, which can be the same as that shown in FIG. 6*a*, and immediately afterward binder is pressed into the perforation by a binder pressing device 52, 58. The top and bottom webs 61 and 62 are then guided back onto the stack and the complete stack is after-treated by an after-treatment device 16. The following cutting and folding steps are not 30 shown.

What is claimed is:

1. A method for producing printed products consisting of a stack of sheets adhesively joined and folded along a middle line from a plurality of continuously moving paper webs with the steps of continuously moving a plurality of webs together to form a stack with two main, outer surfaces continuously moving in a first, longitudinal direction, adhesively joining the paper webs of the continuously moving stack along equidistant junction lines perpendicular to the first direction of the stack by injecting a liquid binder into said stack from at least one of the main surfaces of the stack along said junction lines and wetting all layers of the stack with the insected binder, bringing two additional webs together with the continuously moving stack such that they cover the main surfaces of the stack, cutting the continuously moving stack midway between each pair of said equidistant junction lines to form individual stacks, and folding each individual stack along said junction line.

2. A method according to claim 1 and including the step of pressing the webs together after injecting binder into the webs in the continuously moving stack.

3. A method according to claim 1 and including treating the webs with ultrasonic energy after injecting binder into the webs in the continuously moving stack.

4. A method according to claim 1 wherein the step of injecting the binder includes pressing a plurality of hollow needles into the continuous stack and simultaneously pressing binder through the needle or needles.

5. A method according to claim 4 wherein the hollow needles move with the continuous stack during injection.

6. A method according to claim 1 wherein the step of injecting includes shooting the binder out of a pressure vessel through at least one injection nozzle into the continuous stack.

7. A method according to claim 6 wherein the at least one injection nozzle moves with the continuous stack during binder shooting.

8. A method according to claim 6 wherein the binder is injected by shooting it into the stack from one main surface of the continuously moving stack and folding the individual stacks such that the other main surface forms the outside of the folded product.

9. A method according to claim 1 wherein the step of injecting includes pre-perforating the continuously moving stack with at least one pre-perforation needle immediately followed by pressing binder into the pre-perforations.

10. A method according to claim 9 wherein the at least one pre-perforation needle moves with the stack during pre-perforation and that for pressing the binder into the stack at least one nozzle is brought onto the surface of the stack, and wherein the at least one nozzle moves with the stack while binder is pressed into the pre-perforations.

* * * * *